United States Patent [19]
Häfele

[11] 3,708,150
[45] Jan. 2, 1973

[54] FAST CLOSING VALVE
[76] Inventor: Carl Heinz Häfele, Bergstrasse 83, Monchegladbach, Germany
[22] Filed: Aug. 2, 1971
[21] Appl. No.: 167,961

[30] Foreign Application Priority Data

Aug. 6, 1970 Germany.....................P 20 39 086.7

[52] U.S. Cl. .......................251/31, 251/89, 251/75, 91/DIG. 4
[51] Int. Cl...........................................F16k 31/143
[58] Field of Search................251/75, 31, 69, 89, 65; 91/DIG. 4

[56] References Cited
UNITED STATES PATENTS

| 2,960,971 | 11/1960 | Tear | 251/75 X |
| 3,326,236 | 6/1967 | Beckett et al. | 251/65 X |

*Primary Examiner*—Arnold Rosenthal
*Attorney*—Walter Becker

[57] ABSTRACT

The specification discloses a valve having a valve member to which is connected a double acting piston. A magnetic armature connected to the piston is disposed close to an end wall of the cylinder in which the piston moves when the valve member is in open position and a holding magnet on the outer side of the end wall cooperates with the armature.

8 Claims, 2 Drawing Figures

FAST CLOSING VALVE

The present invention relates to a fast closing valve in which the valve cone is connected to a double-acting control piston which under the influence of a pressure medium, for instance the operating medium, is adapted to move the valve cone into opening and closing position, and in which the control piston has connected thereto an armature which in the open position of the valve cone is exposed to a magnetic field of a holding magnet.

According to a heretofore known fast closing valve of the type involved, the operating medium is in the form of a pressure medium conveyed to one or the other pressure side of the control piston in the pressure medium chamber through a connecting line having a relatively small cross section. The pressure medium chamber has further connected thereto two relief conduits with considerably larger cross section through which the pressure medium may be discharged from the relieved portion of the pressure medium chamber so that the control piston and thereby the valve cone will by the pressure on the other side of the control piston be moved at high speed to its other end position.

With such fast closing valve it is important that when the valve is open, the valve cone will not for any reason under the influence of its own weight and/or due to flow forces accidentally move to its closing position. With some of the heretofore known fast closing valves, for preventing such accidental movement, there is provided a mechanical arresting device by means of which the valve cone is held in its open position. The release of such arresting mechanism is, however, in many instances not sufficiently reliable.

A fast closing valve has also become known according to which a holding magnet is provided for holding the valve cone in its open position. The force of this holding magnet, which for instance may be a permanent magnet, is so selected that it is somewhat greater than the effective force of gravity of the valve cone and of the control piston. When closing such a valve, it is necessary, in addition to overcoming the other forces, also to overcome the tear-off force of the magnetic coupling which, however, with a corresponding dimensioning of the control piston or the pressure medium forces can easily be realized.

With this heretofore known fast closing valve an armature is by means of an axially extending connecting bar connected to the control piston. This connecting bar is passed from the pressure fluid chamber toward the outside and is sealed by a so-called stuffing box seal. Stuffing box seals are not absolutely tight, as is well known, and therefore must not be used in certain instances, for instance, in nuclear power plants.

It is, therefore an object of the present invention to provide means for use in connection with the employment of a holding magnet in a fast closing valve, which means will make it possible to convey the magnetic forces to the armature connected to the control piston without the necessity of providing a passage through the wall of the pressure medium chamber so that an additional seal will not be necessary.

These and other objects and advantages of the invention will appear more clearly from the following specification in connection with the accompanying drawings, in which.

Figure 1:
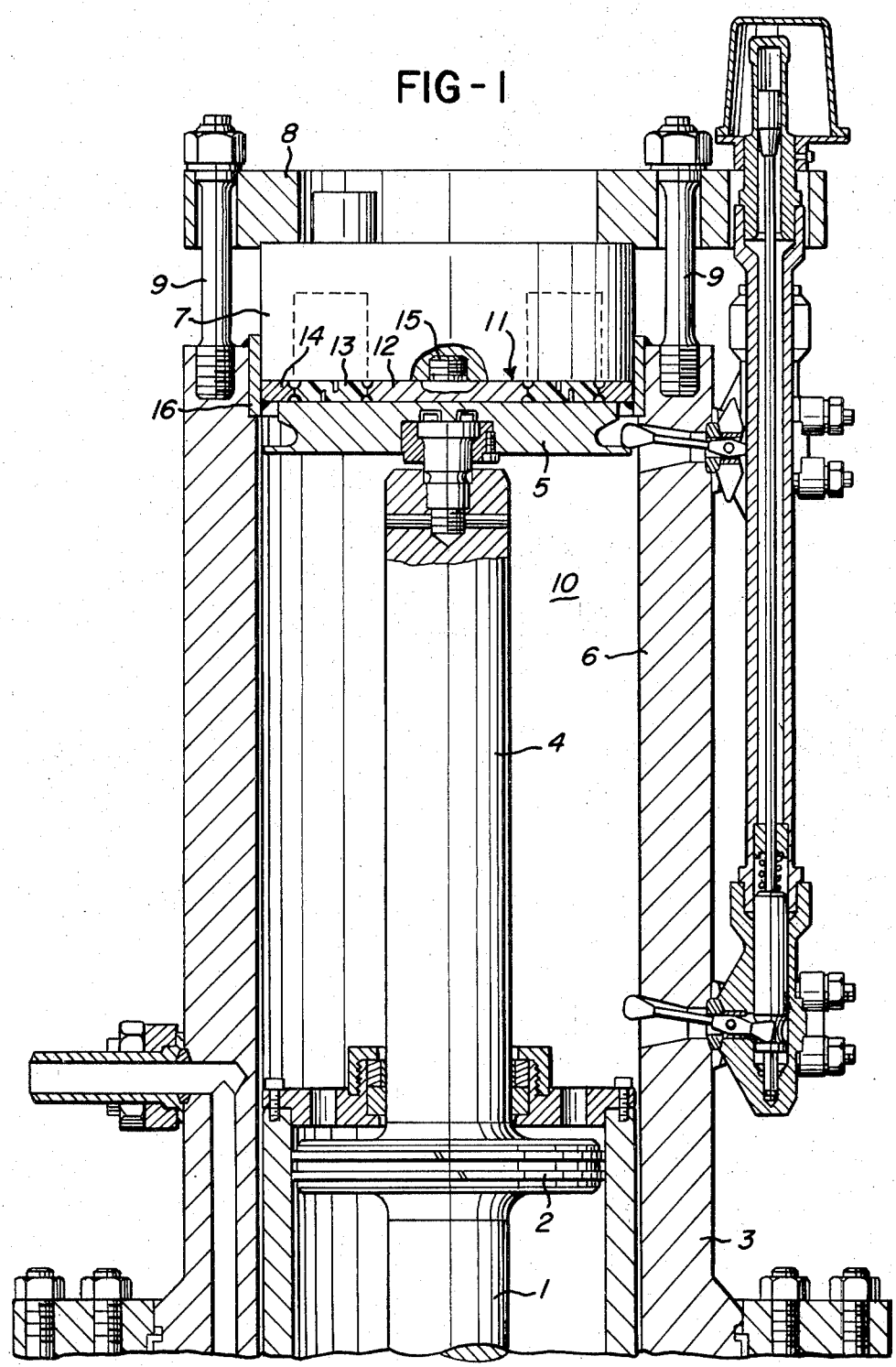
FIG. 1 illustrates an axial section through the upper portion of a fast closing valve according to the invention with a pressure medium chamber and a double-acting control piston while showing the holding magnet at the upper end of the fast closing valve.

The fast closing valve according to the invention, in which the valve cone is connected to a double-acting control piston which latter, under the influence of a pressure medium, is adapted to move the control cone into opening and closing position, while an armature is connected to the control piston which armature in the open position of the valve cone is exposed to the magnetic field of a holding magnet, is characterized primarily in that the armature is located in the pressure medium chamber housing the control piston and when the valve is completely opened is from the holding magnet located outside the pressure medium chamber separated by a wall of the pressure medium chamber which wall is formed by a circular plate with an inner disc which consists of magnetic material, an intermediate annular section arranged coaxially with regard to the pole core and made of a non-magnetic material and an outer annular section made of a magnetic material, the holding magnet being in the form of an inner pole core and an outer pole ring coaxial therewith.

According to a further development of the invention, the intermediate ring section consists of austenitic steel while the inner disc as well as the outer ring section consist of magnetic steel, the individual parts being interconnected by welding. According to a still further development of the invention, the inner disc is connected to the pole core of the holding magnet while the outer ring section is connected to the pole ring of the holding magnet.

According to the present invention, it is furthermore provided that those surfaces of the inner disc and of the outer annular section which face the pressure medium chamber protrude beyond the intermediate ring section. In this way a proper engagement of the armature with the inner disc and the outer ring section will be assured through which are conveyed the lines of force from the holding magnet to the armature. For this function, a difference in height of 1 mm of the surfaces of the inner disc and the outer ring section relative to the intermediate ring section will be sufficient.

According to a further feature of the invention and to take into consideration the different coefficients of expansion of the two materials, there are provided in the intermediate ring section concentric expansion grooves starting from one or both surfaces.

The wall of the pressure medium chamber which is located between the armature and the holding magnet may as to its thickness and thereby as to its strength be selected in conformity with the occurring differential pressures between the pressure medium chamber and the surroundings. The thickness of the wall has no influence upon the flux of the lines of force of the holding magnet because, in view of the employment of an intermediate ring of a non-magnetic material, those portions of the wall where the lines of force from the holding magnet enter the armature and vice versa consist of a magnetically conductive material so that a magnetic air gap between the holding magnet and the armature will be avoided. By a connection of the inner disc made of a magnetic material and of the outer annular section with the corresponding parts of the holding magnet, the contact between these parts can be further improved.

An additional magnetizing coil may be arranged on the pole core of the permanent magnet through which coil the force of the permanent magnet can be reinforced, weakened or completely canceled. It may be useful to supplement the magnetic force of the permanent magnet, for instance, for valves in pipe lines for media of very high temperatures. By an opposite magnetization, the magnetic field of the permanent magnet may be compensated for at the start of the closing operation of the valve.

Referring now to the drawings in detail, FIG. 1 shows an axial section through the upper portion of a fast closing valve according to the invention in which a double-acting control piston is reciprocable in the pressure medium chamber while the upper end of the piston carries the holding magnet. More specifically the valve spindle 1 extending from the valve cone carries the control piston 2 which is guided for longitudinal displacement in the cylindrical housing 3. From the control piston 2 there extends a connecting rod 4. That end of the connecting rod 4 which is remote from the piston 2 carries an armature 5. That end of the valve housing 6 which in the drawing forms the upper end is closed by a holding magnet 7 which by means of a flange ring 8 and screw bolt 9 is connected to the housing 6.

The pressure medium chamber 10 containing the pressure fluid for the actuation of the control piston 2 has its upper end (with regard to the drawing) closed by a wall 11. This wall 11 comprises an inner disc 12 and two concentric rings 13, 14 which are connected to each other and to the inner disc by welding. Of these rings 13, 14, the intermediate ring 13 consists of a nonmagnetic material. The disc 12 is by means of an extension 15 connected to the core of the holding magnet 7, The outer closure of the wall is formed by a cylindrical ring 16 which on one hand is welded to wall 11 and on the other hand is welded to the housing 6. The lines of force leaving the pole core of the holding magnet 7 pass through disc 12, armature 5 and from the latter primarily through the outer ring 14 and from there into the pole ring of the yoke of the holding magnet 7, which yoke is preferably pot-shaped. Inasmuch as in the course of the path of the lines of force all magnetically effective parts are closely engaging each other, practically no air gap is present.

Figure 2:
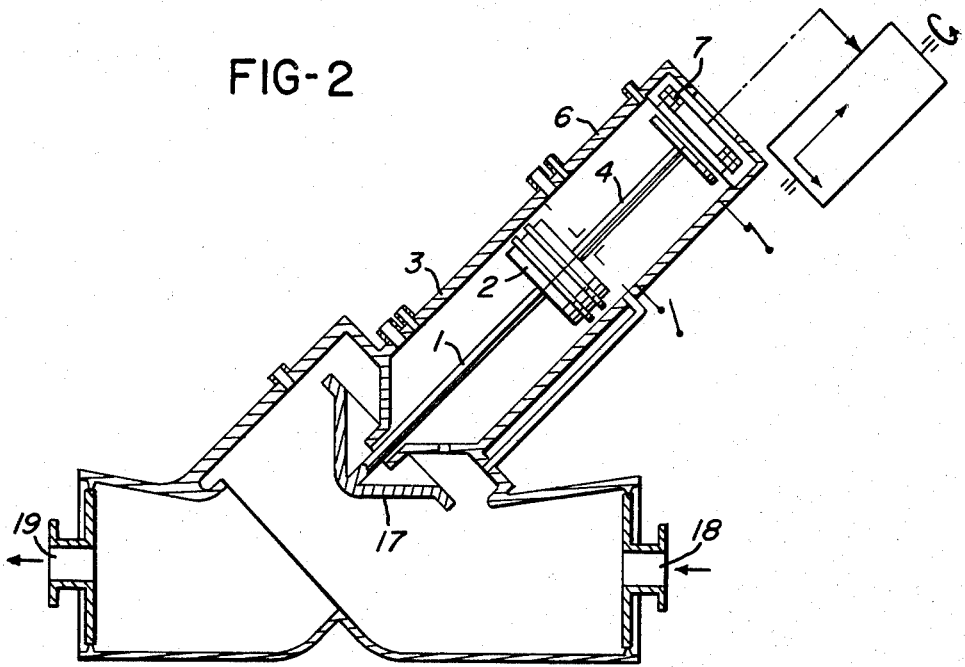
FIG. 2 shows a section through the fast closing valve of FIG. 1, but on a considerably smaller scale than that of FIG. 1 and more diagrammatically.

FIG. 2 diagrammatically shows a fast closing valve according to the invention in its entirety. This figure also shows the valve spindle 1 connected to the valve cone 17 and also shows the inlet 18 and the outlet 19 of the valve. The remaining parts of the valve will be evident from the description of FIG. 1.

It is, of course, to be understood that the present invention is, by no means, limited to the particular showing in the drawings but also comprises any modifications within the scope of the appended claims.

What is claimed is:

1. A fast closing valve; a valve body having a flow passage with a valve seat, a valve member cooperating with said seat, a double acting piston connected to said valve member, a magnetic armature connected to said piston, a holding magnet adjacent the position occupied by said armature in open position of said valve member, a cylinder in which said piston is reciprocable, said armature being disposed in said cylinder on one side of said piston, the end wall of said cylinder adjacent said holding magnet being disposed between said magnet and said armature, said end wall comprising a central disc of magnetic material, an intermediate annular ring of nonmagnetic material and an outer annular ring of magnetic material said holding magnet comprising a magnetic frame having a central pole registering with said central disc and an outer pole registering with said outer ring, and a coil in the space between said poles.

2. A fast closing valve according to claim 1 in which said disc and outer ring are formed of magnetic material and said intermediate ring is formed of austenitic steel.

3. A fast closing valve according to claim 1 in which said disc and rings are welded together.

4. A fast closing valve according to claim 1 in which said disc is secured to said central pole.

5. A fast closing valve according to claim 4 in which said outer ring is secured to said outer pole.

6. A fast closing valve according to claim 1 in which said outer ring is secured to said outer pole.

7. A fast closing valve according to claim 1 in which the surfaces of said disc and outer ring facing said armature are disposed in a plane near to the armature than the plane of said intermediate ring.

8. A fast closing valve according to claim 1 in which said intermediate ring is provided with annular expansion groove means formed into at least one face thereof.

* * * * *